Oct. 3, 1939.  A. T. REPP  2,174,838
PROCESS OF TREATMENT OF SWEET POTATOES AND YAMS
Filed July 2, 1938
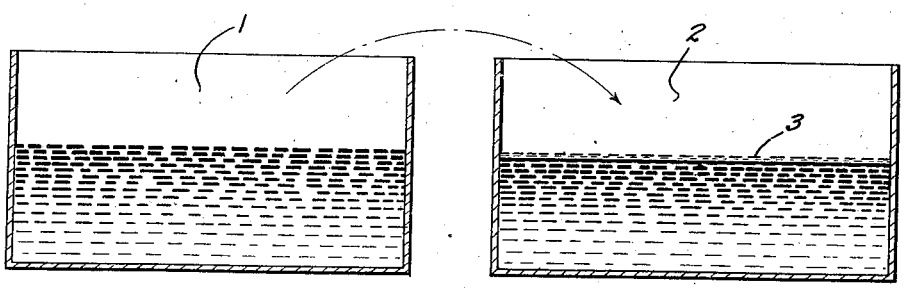
Inventor
Albert T. Repp
By Mason, Fenwick & Lawrence
Attorneys

UNITED STATES PATENT OFFICE 2,174,838

PROCESS OF TREATMENT OF SWEET POTATOES AND YAMS

Albert T. Repp, Swedesboro, N. J.

Application July 2, 1938, Serial No. 217,263

1 Claim. (Cl. 99—168)

This invention relates to the treatment of sweet potatoes and yams, having for its object to improve the keeping qualities of the potato, to increase the sales appeal by enhancing the natural color of the potato, and to modify the physical character of the potato when cooked so that the skin breaks away readily from the meat of the potato leaving the latter intact.

Other objects of the invention will appear as the following description of a preferred and practical embodiment thereof proceeds.

In the drawing which accompanies and forms a part of the following specification, the sole figure represents diagrammatically the two baths employed in carrying out the complete process.

Before referring in detail to the drawing, it may be stated that the sweet potato, including the yam, is probably the most difficult natural food product to handle without inciting deterioration or decay. Unless sweet potatoes are intended for immediate consumption, that is to say, to be used within a week or two after being harvested, it is necessary to subject them to a seasoning or drying out treatment in a storage house at a comparatively uniform and rather warm temperature. The optimum temperature range is from 50 to 75 degrees, and generally to accelerate drying the higher temperature is applied first and gradually permitted to cool down to 50 degrees. Under such conditions of storage, the sweet potatoes may be kept almost indefinitely, but they are so delicate that even if they are moved from one position in the storage house to another, decay or softening is almost certain to set in.

When it comes time to ship the sweet potatoes from the storage house to the market destination, the packing and shipment must be conducted as expeditiously as possible and even then the movement of the potatoes from the shipper to the consumer is generally attended by a large proportion of spoilage. After the potatoes have reached the consumer they must be consumed quickly to avoid further loss. All of this seems to be due to 'he pressure upon the surface of the potatoes occasioned by the inevitable shifting of position which they undergo which seems to bruise the skin of the potato, giving ingress to the spores of potato rot and other diseases to which they are susceptible and the spores or germs of which lurk in practically all places where sweet potatoes are stored, in readiness to do their deadly work upon the slightest bruising of the cortex of the potato.

The process of the present invention is applied to the potatoes immediately upon their removal from the seasoning store-house to be packed for shipment and it consists primarily in rendering the surface of the potatoes immune to the access of germ or bacterial life by coating the skin of the potatoes with a thin film of a suitable liquid oil thereby effecting the sealing of the pores and all other avenues of entrance by which the rot spore may enter into the potato.

The oil selected must of course be edible in nature and preferably resistant to rancidity. I have found that most vegetable oils such as corn oil, cotton seed oil and olive oil are well adapted for the purpose, as is also an edible mineral oil, that is to say, an oil so highly refined that it may be described as of medicinal quality. The preference in the choice of oils, if any, lies with the refined mineral oil on account of its immunity to becoming rancid.

The process is best carried out in the following manner: Two tanks 1 and 2 are employed, one as a washing tank and the other as a treatment tank. The washing tank may contain nothing but water into which potatoes taken immediately from the storage house are immersed and preferably agitated so as to clean them thoroughly. The treating tank contains water up to a certain depth on which is floating a thin film 3 of the vegetable or mineral oil. In a tank 6 x 8' in horizontal area and containing 60 gallons of water, I may place 2 ounces of the selected oil which floats in a film of almost immeasurable thinness. The potatoes are raised from the washing bath and immersed in the treating bath. They pass through the thin film of oil going down into the treating bath and again when coming up. They are immediately removed, packed in suitable hampers or other suitable containers and set aside to dry. The drying is preferably done in a room at 75 degrees temperature and ordinarily takes 24 hours. It is the water that dries out, the thin film of oil, being non-volatile, remaining. The oil forms a continuous film over the surface of the potato and being liquid, it creeps over such minute places on the surface of the potato as may have been left bare during the submergence of the potatoes in the treating bath through the presence of bubbles. The liquid nature of the oil has another important function. In the course of its future shipment, the surface of the potato may expand thermally. If the coating film were solid it would break or check into a plurality of fine cracks exposing the surface of the potato, but being liquid, the film continually spreads to accommodate itself to the expanded size of the potato.

Sweet potatoes thus treated may be shipped for any distances and with impunity as to softening or decay due to germ or spore infection providing the infection has not already started in the original seasoning storehouse.

In order to be assured that the potatoes shall be sterile when shipped, it is preferred to mix with the ingredients of the treating bath a fungicide or bactericide such for example as liquid sulphur and in a tank of the proportions stated, one-half gallon of liquid sulphur is employed to 60 gallons of water. Such a quantity of water and sulphur is sufficient for treating 300 bushels of sweet potatoes, but the oil film must be renewed from time to time as depleted, 2 ounces been added to every 10 bushels of potatoes.

The natural surface of a sweet potato or yam even after being washed, has when dried, an unattractive dull mud color. Viewed under a microscope, the skin of the sweet potato will be found not to be smooth, but having a rough pitted or porous texture. This produces diffuse reflection of light which obscures the natural color of the potato, in the same manner that light is diffusely reflected from snow making it look white instead of transparent like water. When a sweet potato is clean and wet, these microscopic pits, pores or interstices are filled with the wetting liquid and the natural rich color of the potato becomes apparent. The film of liquid vegetable or edible mineral oil which I employ for improving the keeping qualities of sweet potatoes has this effect of bringing out the natural rich color of the potato and the roots so treated having a sales appeal which brings a higher price in the market than that of potatoes not so treated.

I have found also that the treatment of sweet potatoes by the process of the present invention improves their eating qualities, for the liquid oil seals the pores through which steam when generated would normally escape during the progress of cooking and the steam being thus imprisoned forces the skin away from the underlying meat of the potato so that the skin may be readily peeled off leaving the body of the potato intact. This quality is of course most evident in dry cooked sweet potatoes such as baked potatoes. It is of course essential for the production of this result that the oil with which the potatoes are treated shall be sufficiently heat-resistant to withstand a temperature up to at least that of the boiling point of water without disintegrating. Practically all edible vegetable oils as well as refined edible mineral oil have a heat stability amply sufficient for this purpose.

One of the advantages of my process of treating sweet potatoes is that it involves the use only of edible ingredients, the employment of which is sanctioned by the pure food laws, and the enhancement of the color is not accomplished by the addition of any artificial coloring matter, but solely by the bringing out in a physical manner the natural bright rich color of the roots.

While I have in the above description disclosed what I believe to be a practical and preferred embodiment of the invention, it will be understood to those skilled in the art that the details of the process as described as well as the technique by which it is carried out are by way of example and not to be construed as limiting the scope of the invention as claimed.

What I claim is:

Process for treating sweet potatoes comprising seasoning the potatoes by subjecting them to a comparatively uniform drying out temperature within a range of from 50° to 75° F., wetting the surface of the potatoes subsequent to the seasoning, and immediately while the surface is wet, coating them with a thin film of transparent nonvolatile edible oil, and drying the aqueous moisture, leaving the oil film on the surface of the potatoes.

ALBERT T. REPP.